(12) United States Patent
Halbritter et al.

(10) Patent No.: US 11,938,690 B2
(45) Date of Patent: Mar. 26, 2024

(54) METHODS FOR REPLICATING A CONTOUR OF A SURFACE AND TRANSPORTING A COMPOSITE MATERIAL

(71) Applicant: The Boeing Company, Chicago, IL (US)

(72) Inventors: Allen Halbritter, Charleston, SC (US); Luis F. Velasquez, Charleston, SC (US)

(73) Assignee: The Boeing Company, Arlington, VA (US)

( * ) Notice: Subject to any disclaimer, the term of this patent is extended or adjusted under 35 U.S.C. 154(b) by 0 days.

(21) Appl. No.: 17/548,822

(22) Filed: Dec. 13, 2021

(65) Prior Publication Data

US 2023/0182412 A1 Jun. 15, 2023

(51) Int. Cl.
*B29C 70/44* (2006.01)
*B25J 15/06* (2006.01)
*B29C 43/12* (2006.01)

(52) U.S. Cl.
CPC ......... *B29C 70/443* (2013.01); *B25J 15/0616* (2013.01); *B29C 43/12* (2013.01)

(58) Field of Classification Search
CPC ......... B29C 70/44; B29C 70/46; B29C 43/10; B29C 2043/3605; B29C 43/56; B29C 2043/561
USPC ........................................................ 264/510
See application file for complete search history.

(56) References Cited

U.S. PATENT DOCUMENTS

| 4,702,376 | A | 10/1987 | Pagliaro |
| 7,172,714 | B2 * | 2/2007 | Jacobson ............ B29C 33/3821 264/108 |
| 11,135,805 | B2 | 10/2021 | Kozar et al. |
| 2014/0077423 | A1 * | 3/2014 | Brummerstadt ...... B29C 43/003 425/389 |
| 2014/0265058 | A1 | 9/2014 | Gautier et al. |
| 2018/0339413 | A1 | 11/2018 | Halbritter |

FOREIGN PATENT DOCUMENTS

| DE | 202014103132 | 10/2015 |
| EP | 3 670 159 | 6/2020 |
| WO | WO-2021023979 A1 * | 2/2021 ............. B29C 35/02 |

OTHER PUBLICATIONS

European Patent Office, Extended European Search Report, App. No. 22204199.8 (dated May 4, 2023).

* cited by examiner

*Primary Examiner* — Yunju Kim
(74) *Attorney, Agent, or Firm* — Walters & Wasylyna LLC (57) ABSTRACT

A pliable structure includes a first impermeable layer, a second impermeable layer opposed from the first impermeable layer to at least partially define an internal volume between the first impermeable layer and the second impermeable layer, and a flow media layer disposed in the internal volume.

20 Claims, 7 Drawing Sheets

METHODS FOR REPLICATING A CONTOUR OF A SURFACE AND TRANSPORTING A COMPOSITE MATERIAL

FIELD

The present disclosure generally relates to manufacturing composite structures and, more particularly, to a pliable structure and associated method and system for replicating a contour of a surface.

BACKGROUND

Manufacturing of large parts from flexible materials, such as composite materials, typically requires movement of the flexible materials throughout the manufacturing environment. Current means of moving flexible materials, such as pick and place apparatuses, utilize mechanical means such as suction cups to grip and hold the materials they are moving. In most applications, the suction cups are not completely distributed across the entire surface thus there can be draping of material between the suction cups. Additionally, these suctions cups are often ridged and not highly conformable and tend to result in some damage to the material.

Accordingly, those skilled in the art continue research and development in the field of transporting flexible materials.

SUMMARY

The following is a non-exhaustive list of examples, which may or may not be claimed, of the subject matter according to the present disclosure Disclosed is a pliable structure.

In an example, the pliable structure includes a first impermeable layer, a second impermeable layer opposed from the first impermeable layer to at least partially define an internal volume between the first impermeable layer and the second impermeable layer, and a flow media layer disposed in the internal volume.

Also disclosed is a system for replicating a contour of a surface.

In an example, the system for replicating a contour of a surface includes a pliable structure and a vacuum source fluidly coupled to the pliable structure with a vacuum tube.

Also disclosed is a method for replicating a contour of a surface.

In an example, the method for replicating a contour of a surface includes engaging an engagement surface of a pliable structure with the surface such that the engagement surface of the pliable structure assumes the contour of the surface. The method further includes drawing a vacuum from the pliable structure to lock the engagement surface of the pliable structure to the contour of the surface.

Also disclosed is a method for transporting an uncured ply of composite material.

In an example, the method for transporting an uncured ply of composite material includes positioning the uncured ply of composite material on a tool, engaging a pliable structure with the uncured ply of composite material, and drawing a vacuum from the pliable structure to lock the pliable structure to a shape of the uncured ply of composite material, thereby preventing shear of the first impermeable layer and second impermeable layer of pliable structure relative to the flow media layer. The method further includes adhering the uncured ply of composite material to the pliable structure, disengaging the uncured ply of composite material from the tool while retaining a contour of the tool, and placing the uncured ply of composite material onto a prior placed ply of composite material or a second tool while retaining a contour of the tool.

DETAILED DESCRIPTION

The following detailed description refers to the accompanying drawings, which illustrate specific examples described by the present disclosure. Other examples having different structures and operations do not depart from the scope of the present disclosure. Like reference numerals may refer to the same feature, element, or component in the different drawings.

Illustrative, non-exhaustive examples, which may be, but are not necessarily, claimed, of the subject matter according the present disclosure are provided below. Reference herein to "example" means that one or more feature, structure, element, component, characteristic, and/or operational step described in connection with the example is included in at least one embodiment and/or implementation of the subject matter according to the present disclosure. Thus, the phrases "an example," "another example," "an example," and similar language throughout the present disclosure may, but do not necessarily, refer to the same example. Further, the subject matter characterizing any one example may, but does not necessarily, include the subject matter characterizing any other example. Moreover, the subject matter characterizing any one example may be, but is not necessarily, combined with the subject matter characterizing any other example.

In one or more examples, the pliable structure 100 (FIG. 1), system 150 (FIGS. 2 and 3), method 200 (FIG. 4), and method 300 (FIG. 5) may be used to facilitate manufacturing of composite parts, i.e., workpieces. In one example, composite parts, such as carbon fiber reinforcement polymer parts, are initially laid-up in multiple layers that together are referred to as a laminate or "preform." Individual fibers within each layer of the laminate are aligned parallel with each other, but different layers may exhibit different fiber orientations in order to increase the strength of the resulting composite part along different dimensions. The laminate may include a viscous resin that solidifies in order to harden the laminate into a composite part (e.g., for use in an aircraft). In an example, the pliable structure 100, system 150, method 200, and method 300 may be used to facilitate manufacturing of composite parts comprised of thermoplastic resins.

Figure 1:
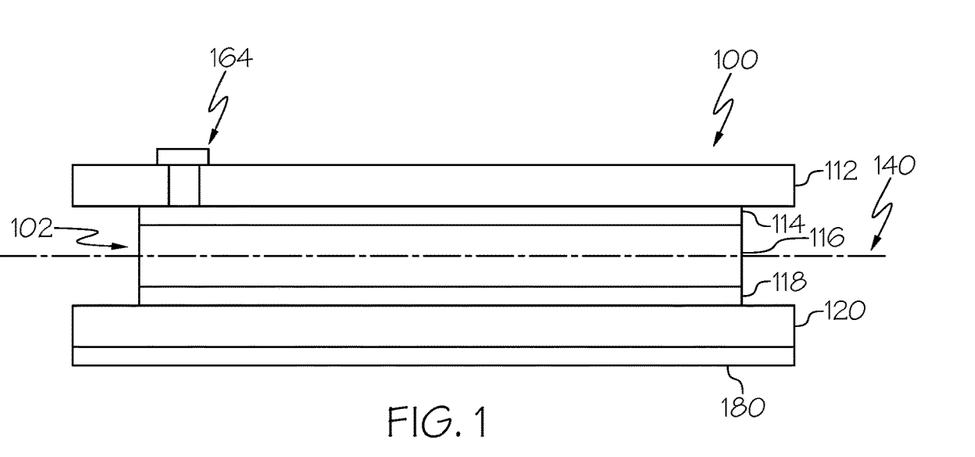
FIG. 1 is a cross-sectional schematic view of a pliable structure.

Referring to FIG. 1, disclosed is a pliable structure 100. The pliable structure 100 includes various layers in a layered or sandwich configuration. The pliable structure 100 includes a first impermeable layer 112. The first impermeable layer 112 is substantially impermeable to fluids, including air. In one example, the first impermeable layer 112 comprises a polymeric material. In another example, the first impermeable layer 112 comprises rubber. In one specific, non-limiting example, the first impermeable layer 112 comprises a Mosites™ rubber sheet.

Still referring to FIG. 1, the pliable structure 100 includes a second impermeable layer 120 opposed from the first impermeable layer 112. The opposing sandwich relationship between the first impermeable layer 112 and the second impermeable layer 120 at least partially defines an internal volume 102 between the first impermeable layer 112 and the second impermeable layer 120. In one example, the first impermeable layer 112 and the second impermeable layer 120 enclose the internal volume 102.

In one example, the second impermeable layer 120 comprises a polymeric material. In another example, the second impermeable layer 120 comprises rubber. In one example, the first impermeable layer 112 and the second impermeable layer 120 are compositionally alike such that they comprise the same material. In yet another example, the first impermeable layer 112 and the second impermeable layer 120 are compositionally different.

The pliable structure 100 may include an engagement feature 180. In one example, the engagement feature 180 is coupled to the second impermeable layer 120. The engagement feature 180 may assist in engaging a flexible material 130 with the pliable structure 100. In one example, the engagement feature 180 comprises an electrostatic feature 184. In another example, the engagement feature comprises 180 a suctioning feature 182.

Still referring to FIG. 1, the pliable structure 100 includes a flow media layer 114 disposed in the internal volume 102. In on example, the flow media layer 114 comprises a biplanar mesh. In another example, the flow media layer 114 is a sheet of material, such as a biplanar mesh.

Referring to FIG. 1, the pliable structure includes a vacuum port 164. The vacuum port 164 may be coupled with the first impermeable layer 112 or the second impermeable layer 120. The vacuum port 164 is in fluid communication with the internal volume 102 of the pliable structure 100 such that when a vacuum is drawn, air is evacuated from the internal volume 102 of the pliable structure 100.

In one or more examples, the pliable structure 100 may further include a core layer 116 positioned in a layered configuration between the flow media layer 114 and the second impermeable layer 120. The core layer 116 may be any desirable thickness and stiffness needed. In one example, the core layer 116 comprises wood, such as balsa wood, or any other wood having desirable flexibility to conform to a contour of a surface 172. In another example, the core layer 116 comprises foam.

Still referring to FIG. 1, the pliable structure 100 may further comprise a second flow media layer 118 positioned between the core layer 116 and the second impermeable layer 120. The second flow media layer 118 may include a permeable layer such as a sheet of biplanar mesh.

Figure 2:
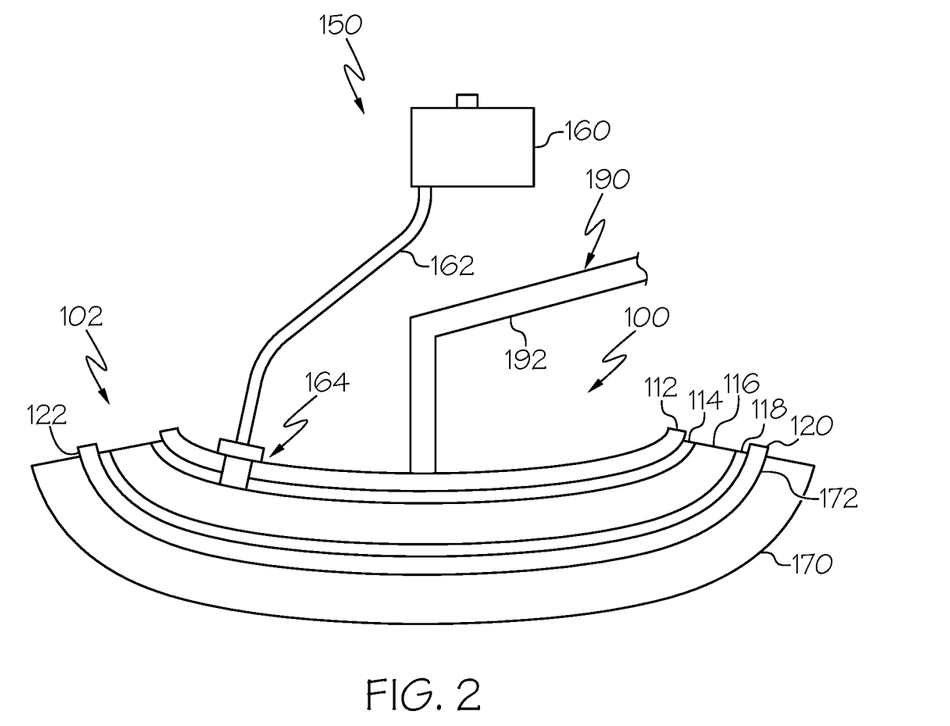
FIG. 2 is a cross-sectional schematic view of a system for replicating a contour of a surface.
Figure 3:
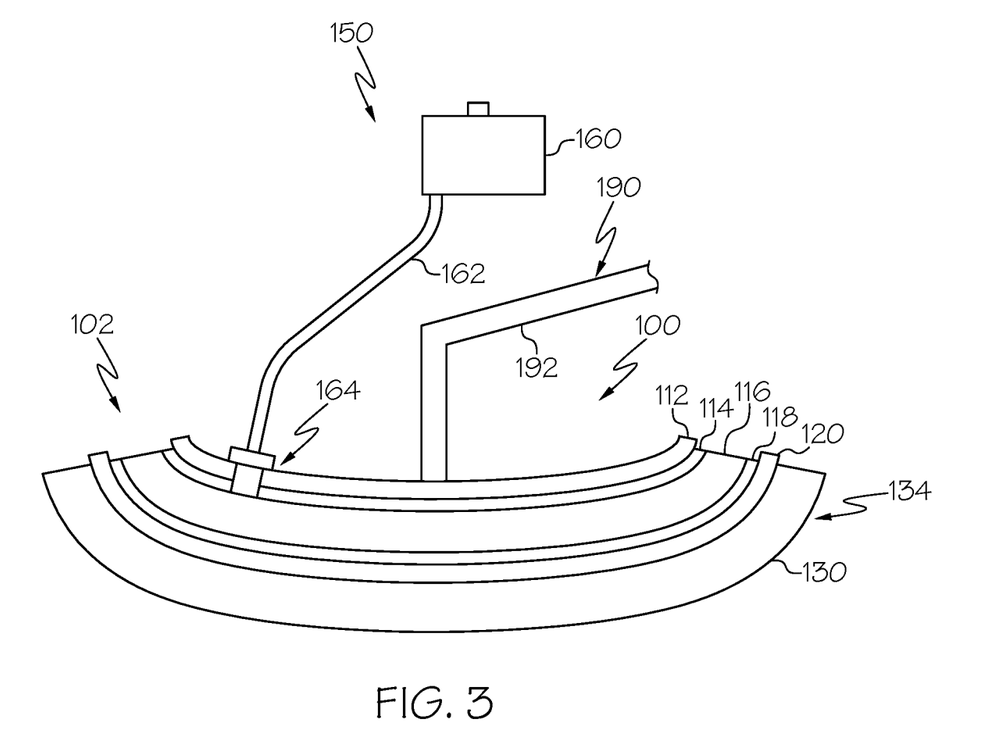
FIG. 3 is a cross-sectional schematic view of a system for replicating a contour of a surface

Referring to FIG. 2 and FIG. 3, disclosed is a system 150 for replicating a contour of a surface 172. The surface 172 of a tool 170, mandrel, or any other mold. The system 150 includes a pliable structure 100.

The pliable structure 100 includes a first impermeable layer 112. The first impermeable layer 112 is substantially impermeable to fluids, including air. In one example, the first impermeable layer 112 comprises a polymeric material. In another example, the first impermeable layer 112 comprises rubber.

In one or more examples, the pliable structure 100 of the system 150 includes a second impermeable layer 120 opposed from the first impermeable layer 112. The opposing sandwich relationship between the first impermeable layer 112 and the second impermeable layer 120 at least partially defines an internal volume 102 between the first impermeable layer 112 and the second impermeable layer 120. In one example, the first impermeable layer 112 and the second impermeable layer 120 enclose the internal volume 102.

In one example, the second impermeable layer 120 comprises a polymeric material. In another example, the second impermeable layer 120 comprises rubber. In one example, the first impermeable layer 112 and the second impermeable layer 120 are compositionally alike such that they comprise the same material. In yet another example, the first impermeable layer 112 and the second impermeable layer 120 are compositionally different.

The pliable structure 100 may include an engagement feature 180, see FIG. 1. In one example, the engagement feature 180 is coupled to the second impermeable layer 120. The engagement feature 180 may assist in engaging a flexible material 130 with the pliable structure 100. In one example, the engagement feature 180 comprises an electrostatic feature 184. In another example, the engagement feature comprises 180 a suctioning feature 182.

The pliable structure 100 includes a flow media layer 114 disposed in the internal volume 102. In on example, the flow media layer 114 comprises a biplanar mesh. In another example, the flow media layer 114 is a sheet of material, such as a biplanar mesh.

In one or more examples, the pliable structure 100 of the system 150 includes a vacuum port 164. The vacuum port 164 may be coupled with the first impermeable layer 112 or the second impermeable layer 120. The vacuum port 164 is in fluid communication with the internal volume 102 of the pliable structure 100.

In one or more examples, the pliable structure 100 may further include a core layer 116 positioned in a layered configuration between the flow media layer 114 and the second impermeable layer 120. The core layer 116 may be any desirable thickness and stiffness needed. In one example, the core layer 116 comprises wood, such as balsa wood, or any other wood having desirable flexibility to conform to a contour of a surface 172. In another example, the core layer 116 comprises foam.

As illustrated in FIG. 1, the pliable structure 100 of the system 150 may further comprise a second flow media layer 118 positioned between the core layer 116 and the second impermeable layer 120. The second flow media layer 118 may include a permeable layer such as a sheet of biplanar mesh. In one example, the second flow media layer 118 is in the form of a sheet.

Referring to FIG. 2, the system 150 includes a vacuum source 160. The vacuum source 160 is fluidly coupled to the pliable structure 100 with a vacuum tube 162. The vacuum tube 162 is coupled to the vacuum port 164 of the pliable structure 100. In one example, shear slippage is substantially inhibited when a vacuum is drawn in the pliable structure 100.

Referring to FIG. 2 and FIG. 3, the system 150 may further include a controllable movement device 190 coupled to the pliable structure 100. In one example, the controllable movement device 190 includes a robotic arm 192 configured to control movement of the pliable structure 100 from one location, such as a tool 170, to another location for moving a flexible material 130 to a tool 170.

Figure 4:
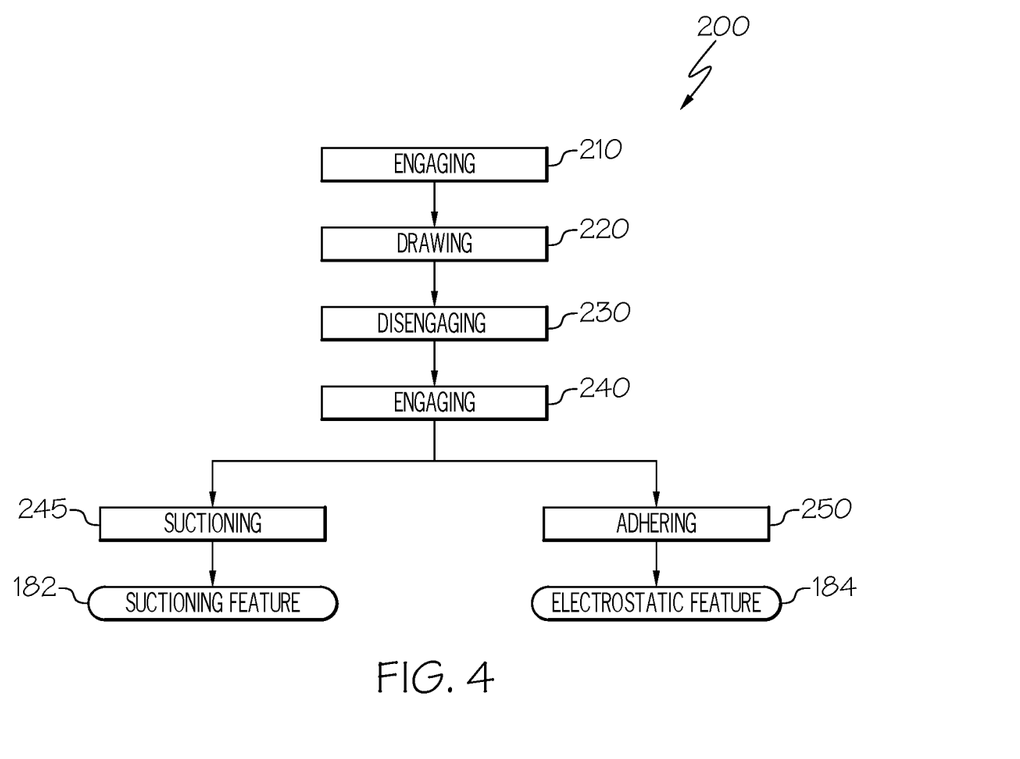
FIG. 4 is a flow chart of a method for replicating a contour of a surface.

Referring to FIG. 4, disclosed is a method 200 for replicating a contour of a surface 172. The method 200 may be performed using the pliable structure 100 as shown and described herein. In one or more examples, the method 200 includes engaging 210 an engagement surface 122 of the pliable structure 100 with the surface 172 such that the engagement surface 122 of the pliable structure 100 assumes the contour of the surface 172. The pliable structure 100 comprises a vacuum port 164 in fluid communication with an internal volume 102.

The pliable structure 100 includes a first impermeable layer 112. The first impermeable layer 112 is substantially impermeable to fluids, including air. In one example, the first impermeable layer 112 comprises a polymeric material. In another example, the first impermeable layer 112 comprises rubber.

In one or more examples, the pliable structure 100 of the method 200 includes a second impermeable layer 120 opposed from the first impermeable layer 112. The opposing sandwich relationship between the first impermeable layer 112 and the second impermeable layer 120 at least partially defines an internal volume 102 between the first impermeable layer 112 and the second impermeable layer 120. In one example, the first impermeable layer 112 and the second impermeable layer 120 enclose the internal volume 102.

In one example, the second impermeable layer 120 comprises a polymeric material. In another example, the second impermeable layer 120 comprises rubber. In one example, the first impermeable layer 112 and the second impermeable layer 120 are compositionally alike such that they comprise the same material. In yet another example, the first impermeable layer 112 and the second impermeable layer 120 are compositionally different.

The pliable structure 100 may include an engagement feature 180, see FIG. 1. In one example, the engagement feature 180 is coupled to the second impermeable layer 120. The engagement feature 180 may assist in engaging a flexible material 130 with the pliable structure 100. In one example, the engagement feature 180 comprises an electrostatic feature 184. In another example, the engagement feature comprises 180 a suctioning feature 182.

Illustrated in FIG. 2, the pliable structure 100 includes a flow media layer 114 disposed in the internal volume 102. In on example, the flow media layer 114 comprises a biplanar mesh. In another example, the flow media layer 114 is a sheet of material, such as a biplanar mesh.

In one or more examples, the pliable structure 100 of the method 200 includes a vacuum port 164. The vacuum port 164 may be coupled with the first impermeable layer 112 or the second impermeable layer 120. The vacuum port 164 is in fluid communication with the internal volume 102 of the pliable structure 100.

In one or more examples, the pliable structure 100 may further include a core layer 116 positioned in a layered configuration between the flow media layer 114 and the second impermeable layer 120. The core layer 116 may be any desirable thickness and stiffness needed. In one example, the core layer 116 comprises wood, such as balsa wood, or any other wood having desirable flexibility to conform to a contour of a surface 172. In another example, the core layer 116 comprises foam.

As illustrated in FIG. 2, the pliable structure 100 of the method 200 may further comprise a second flow media layer 118 positioned between the core layer 116 and the second impermeable layer 120. The second flow media layer 118 may include a permeable layer such as a sheet of biplanar mesh. In one example, the second flow media layer 118 is in the form of a sheet.

Referring back to FIG. 4, the method 200 includes drawing 220 a vacuum from the pliable structure 100 to lock the engagement surface 122 of the pliable structure 100 to the contour of the surface 172. The drawing 220 may be performed via a vacuum source 160 coupled to the pliable structure 100 via a vacuum tube 162 and vacuum port 164 of the pliable structure 100. The drawing 220 includes evacuation of air within the internal volume 102 of the pliable structure 100 such that a vacuum is generated and the pliable structure 100 is locked in a configuration. In one or more examples, the drawing 220 locks the pliable structure 100 such that shear slippage is substantially inhibited between the first impermeable layer 112 and the flow media layer 114. In another example, the drawing 220 locks the pliable structure 100 such that shear slippage is substantially inhibited between the second impermeable layer 120 and the flow media layer 114. The drawing 220 locks the pliable structure 100 by evacuation of air from the internal volume 102, thus increasing friction among the layers of the pliable structure 100 and inhibiting shear slippage.

Still referring to FIG. 4, the method 200 includes disengaging 230 the pliable structure 100 from the surface 172. The disengaging 230 may be performed via a controllable movement device 190. In one example, the controllable movement device 190 includes a robotic arm 192, see FIG. 3.

Still referring to FIG. 4, the method 200 engaging 240 the pliable structure 100 with a flexible material 130. In one example, the flexible material 130 includes at least one uncured ply of composite material 134. In another example, the flexible material 130 includes more than one uncured ply of composite material 134. In one example, the engaging 240 includes suctioning 245 the flexible material 130, or at least one uncured ply of composite material 134, to the pliable structure 100. In another example, the engaging 240 includes electro-statically adhering 250 the at least one uncured ply of composite material 134 to the pliable structure 100.

Figure 5:
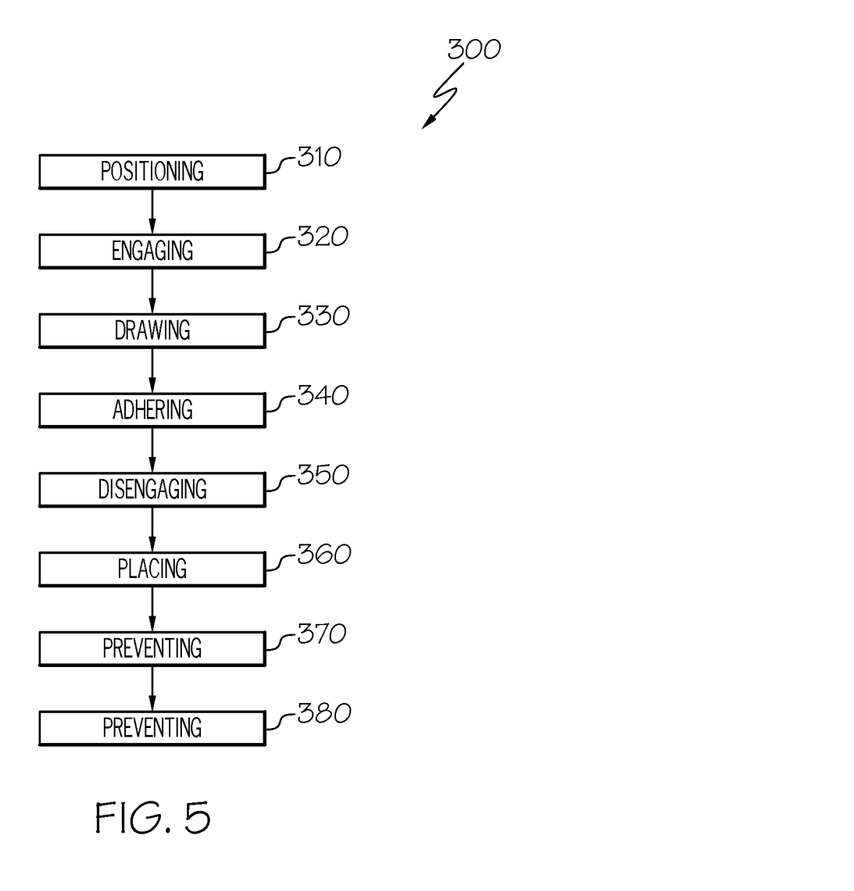
FIG. 5 is a flow chart of a method for transporting an uncured ply of composite material.

Referring to FIG. 5, disclosed is a method 300 for transporting an uncured ply of composite material 134. In one example, the method 300 includes positioning 310 the uncured ply of composite material 134 on a tool 170. The tool 170 may have complex geometry or curvature. In one example, the tool 170 has a previously laid uncured ply of composite material 134 prior to the positioning 310.

Still referring to FIG. 5, the method includes engaging 320 the pliable structure 100 with the uncured ply of composite material 134. After the engaging 320, the 300 further includes drawing 330 a vacuum from the pliable structure 100 to lock the pliable structure 100 to a shape of the uncured ply of composite material 134, thereby preventing shear of the first impermeable layer 112 and second impermeable layer 120 of pliable structure 100 relative to the flow media layer 114. The drawing 330 a vacuum locks the pliable structure 100 by evacuation of air from the internal volume 102, thus increasing friction among the layers of the pliable structure 100 and inhibiting shear slippage.

Still referring to FIG. 5, the method 300 includes adhering 340 the uncured ply of composite material 134 to the pliable structure 100. The adhering 340 may be achieved with an engagement feature 180. In one example, the adhering 340 includes suctioning with a suctioning feature 182. In another example, the adhering 340 includes electro-statically adhering with an electrostatic feature 184.

The method 300 may further include disengaging 350 the uncured ply of composite material 134 from the tool 170 while retaining a contour of the tool 170. The disengaging 350 may be automated and may be performed by a controllable movement device 190, such as a robotic arm 192. In one or more examples, the method 300 further includes placing 360 the uncured ply of composite material 134 onto a prior placed ply of composite material or a second tool while retaining a contour of the tool 170.

Still referring to FIG. 5, the method 300 further includes preventing 370 shear of the first impermeable layer 112 and second impermeable layer 120 of the pliable structure 100 relative to the flow media layer 114 along a slip plane 140 by drawing a vacuum through the internal volume 102. In another example, the method 300 further includes preventing 380 shear of the first impermeable layer 112 and second impermeable layer 120 of the pliable structure 100 relative to the flow media layer 114 along a slip plane 140 by drawing a vacuum normal to the first impermeable layer 112 through the internal volume 102. Drawing a vacuum locks the pliable structure 100 by evacuation of air from the internal volume 102, thus increasing friction among the layers of the pliable structure 100 and inhibiting shear slippage.

Figure 6:
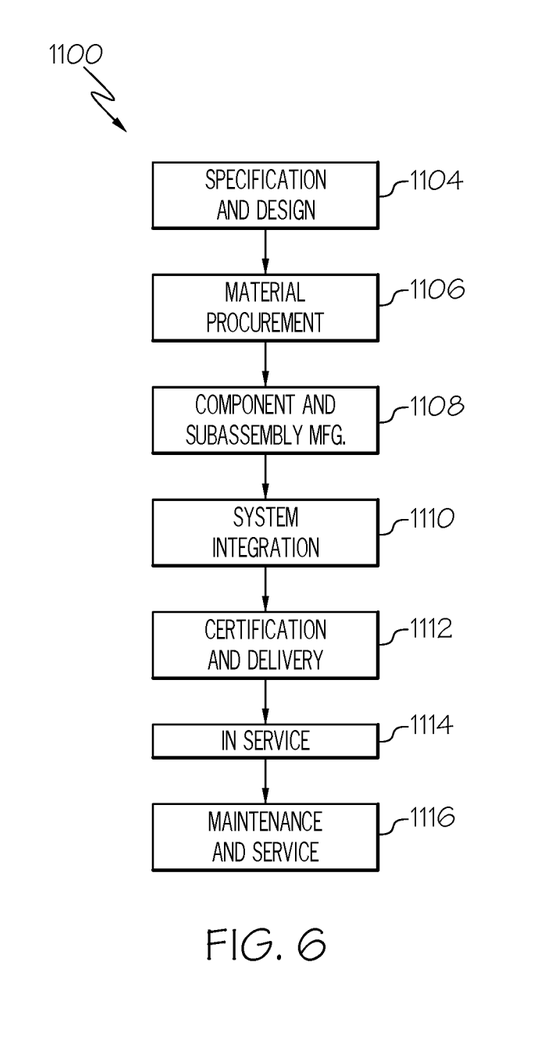
FIG. 6 is a flow chart is a block diagram of aircraft production and service methodology.
Figure 7:
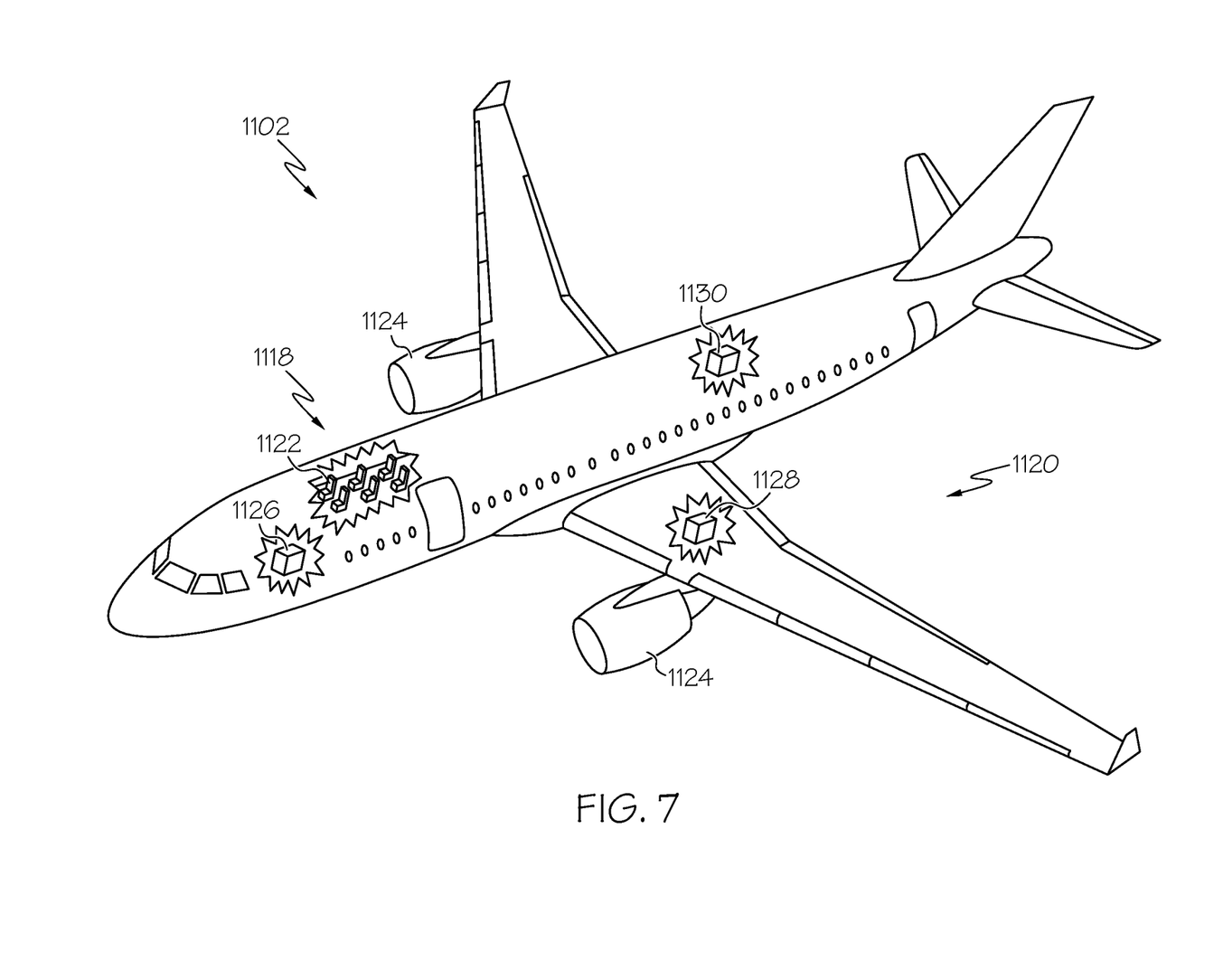
FIG. 7 is a schematic of the aircraft.

Examples of the present disclosure may be described in the context of aircraft manufacturing and illustrative method 1100 as shown in FIG. 6 and aircraft 1102 as shown in FIG. 7. During pre-production, illustrative method 1100 may include specification and design (block 1104) of aircraft 1102 and material procurement (Block 1106). During production, component and subassembly manufacturing (Block 1108) and system integration (Block 1110) of aircraft 1102 may take place. Thereafter, aircraft 1102 may go through certification and delivery (Block 1112) to be placed in service (Block 1114). While in service, aircraft 1102 may be scheduled for routine maintenance and service (Block 1116). Routine maintenance and service may include modification, reconfiguration, refurbishment, etc., of one or more systems of aircraft 1102.

Each of the processes of illustrative method 1100 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

As shown in FIG. 7, aircraft 1102 produced by illustrative method 1100 may include airframe 1118 with a plurality of high-level systems 1120 and interior 1122. Examples of high-level systems 1120 include one or more of propulsion system 1124, electrical system 1126, hydraulic system 1128, and environmental system 1130. Any number of other systems may be included. Although an aerospace example is shown, the principles disclosed herein may be applied to other industries, such as the automotive industry. Accordingly, in addition to aircraft 1102, the principles disclosed herein may apply to other vehicles, e.g., land vehicles, marine vehicles, space vehicles, etc.

Structure(s) and method(s) shown or described herein may be employed during any one or more of the stages of the manufacturing and illustrative method 1100. For example, components or subassemblies corresponding to component and subassembly manufacturing (block 1108) may be fabricated or manufactured in a manner similar to components or subassemblies produced while aircraft 1102 is in service (Block 1114). Also, one or more examples of the structure(s), method(s), or combination thereof may be utilized during production stages production, component and subassembly manufacturing (Block 1108) and system integration (1110), for example, by substantially expediting assembly of or reducing the cost of aircraft 1102. Similarly, one or more examples of the structure or method realizations, or a combination thereof, may be utilized, for example and without limitation, while aircraft 1102 is in service (Block 1114) and/or during maintenance and service (Block 1116).

Different examples of the structure(s) and method(s) disclosed herein include a variety of components, features, and functionalities. It should be understood that the various examples of the structure(s) and method(s) disclosed herein may include any of the components, features, and functionalities of any of the other examples of the structure(s) and method(s) disclosed herein in any combination, and all of such possibilities are intended to be within the scope of the present disclosure.

Many modifications of examples set forth herein will come to mind to one skilled in the art to which the present disclosure pertains having the benefit of the teachings presented in the foregoing descriptions and the associated drawings.

Therefore, it is to be understood that the present disclosure is not to be limited to the specific examples illustrated and that modifications and other examples are intended to be included within the scope of the appended claims. Moreover, although the foregoing description and the associated drawings describe examples of the present disclosure in the context of certain illustrative combinations of elements and/or functions, it should be appreciated that different combinations of elements and/or functions may be provided by alternative implementations without departing from the scope of the appended claims. Accordingly, parenthetical reference numerals in the appended claims are presented for illustrative purposes only and are not intended to limit the scope of the claimed subject matter to the specific examples provided in the present disclosure.

What is claimed is:

1. A method for replicating a tool contour of a tool surface, the method comprising:
  positioning a pliable structure relative to the tool surface of a tool, wherein:
    the pliable structure comprises:
      an internal volume formed by the plurality of sheet layers; and
      a vacuum port in fluid communication with the internal volume;
    each one of the plurality of sheet layers comprises an interior contact surface that is in full surface contact with the interior contact surface of a directly adjacent one of the plurality of sheet layers;
    the exterior engagement surface is formed by one of the plurality of sheet layers and is opposite the interior contact surface of the one of the plurality of sheet layers; and
    the exterior engagement surface has an initial engagement-surface contour that is different than the tool contour of the tool surface of the tool;
  engaging an exterior engagement surface of the pliable structure with the tool surface of the tool such that the exterior engagement surface assumes a final engagement-surface contour that matches the tool contour of the tool surface, wherein, while engaging the exterior engagement surface with the tool surface, a plurality of sheet layers of the pliable structure are capable of slipping relative to each other;

with the exterior engagement surface engaged with the tool surface and having the final engagement-surface contour that matches the tool contour of the tool surface:

drawing a vacuum within the pliable structure;

increasing surface-to-surface friction between the plurality of sheet layers in response to drawing the vacuum such that shear slippage is substantially inhibited between the plurality of sheet layers by increasing surface-to-surface friction between the interior contact surface of at least one of the plurality of sheet layers and the interior contact surface of the directly adjacent one of the plurality of sheet layers of the pliable structure; and locking positions of the plurality of sheet layers relative to each other in response to increasing the surface-to-surface friction; and maintaining the exterior engagement surface of the pliable structure in the final engagement-surface contour after disengaging the exterior engagement surface from the tool surface via the surface-to-surface friction due to the vacuum.

2. The method of claim 1, further comprising disengaging the engagement surface from the tool surface of the tool.

3. The method of claim 2, further comprising engaging the engagement surface with at least one uncured ply of composite material.

4. The method of claim 3, wherein the engaging comprises suctioning the at least one uncured ply of composite material to the engagement surface.

5. The method of claim 3, wherein the engaging comprises electro-statically adhering the at least one uncured ply of composite material to the engagement surface.

6. The method of claim 1, wherein:
the plurality of sheet layers of the pliable structure comprises:
a first impermeable layer;
a second impermeable layer opposed from the first impermeable layer to at least partially define an internal volume between the first impermeable layer and the second impermeable layer;
a flow media layer disposed in the internal volume between the first impermeable layer and the second impermeable layer; and
a core layer disposed in the internal volume between the flow media and one of the first impermeable layer and the second impermeable layer;
the second impermeable layer forms the exterior engagement surface; and
the vacuum is drawn within the internal volume of the pliable structure to increase the surface-to-surface friction between an interior contact surface of and to lock the positions of each one of the first impermeable layer, the second impermeable layer, the flow media layer, and the core layer and an adjacent one of the first impermeable layer, the second impermeable layer, the flow media layer, and the core layer.

7. The method of claim 6, wherein the drawing comprises evacuation of air from the internal volume that locks the pliable structure such that the shear slippage is substantially inhibited between at least the interior contact surface of the first impermeable layer and the interior contact surface of the flow media layer.

8. The method of claim 6, wherein the drawing comprises evacuation of air from the internal volume that locks the pliable structure such that the shear slippage is substantially inhibited between at least the interior contact surface of the second impermeable layer and the interior contact surface of the flow media layer.

9. The method of claim 6, wherein the first impermeable layer comprises rubber.

10. The method of claim 6, wherein the second impermeable layer comprises rubber.

11. The method of claim 6, wherein the first impermeable layer and the second impermeable layer are compositionally alike.

12. The method of claim 6, wherein the first impermeable layer and the second impermeable layer are compositionally different.

13. The method of claim 6, wherein the flow media layer comprises a biplanar mesh.

14. The method of claim 6, wherein the core layer is positioned in a layered configuration between the flow media layer and the second impermeable layer.

15. The method of claim 14, wherein the pliable structure further comprises a second flow media layer positioned between the core layer and the second impermeable layer.

16. The method of claim 6, wherein the core layer comprises foam.

17. The method of claim 1, wherein:
the pliable structure further comprises an engagement feature coupled to one of the plurality of sheet layers; and
the method further comprises engaging and holding an uncured ply of composite material via one of suction or electrostatic adhesion using the engagement feature.

18. A method comprising:
positioning a pliable structure relative to the tool surface of a tool;
engaging an exterior engagement surface of the pliable structure with the tool surface of the tool such that the exterior engagement surface assumes a final engagement-surface contour that matches the tool contour of the tool surface, wherein, while engaging the exterior engagement surface with the tool surface, a plurality of sheet layers of the pliable structure are capable of slipping relative to the interior contact surface of the directly adjacent one of the plurality of layers;
with the exterior engagement surface engaged with the tool surface and having the final engagement-surface contour that matches the tool contour of the tool surface:
drawing a vacuum within the pliable structure;
increasing surface-to-surface friction between the plurality of sheet layers in response to drawing the vacuum such that shear slippage is substantially inhibited between the plurality of sheet layers;
inhibiting shear slippage between an interior contact surface of each one of the plurality of sheet layers in response to increasing surface-to-surface friction between the interior contact surface of each one of the plurality of sheet layers and the interior contact surface of the directly adjacent one of the plurality of sheet layers; and
locking positions of the plurality of sheet layers relative to each other in response to increasing the surface-to-surface friction;

maintaining the exterior engagement surface of the pliable structure in the final engagement-surface contour after disengaging the exterior engagement surface from the tool surface; and engaging the engagement surface with at least one uncured ply of composite material.

19. A method for replicating a tool contour of a tool surface, the method comprising:

positioning a pliable structure relative to the tool surface of a tool;

engaging an exterior engagement surface of the pliable structure with the tool surface of the tool such that the exterior engagement surface assumes a final engagement-surface contour that matches the tool contour of the tool surface, wherein, while engaging the exterior engagement surface with the tool surface, a plurality of sheet layers of the pliable structure are capable of slipping relative to each other;

with the exterior engagement surface engaged with the tool surface and having the final engagement-surface contour that matches the tool contour of the tool surface:

drawing a vacuum within the pliable structure;

increasing surface-to-surface friction between the plurality of sheet layers in response to drawing the vacuum;

inhibiting shear slippage between interior contact surfaces of the plurality of sheet layers in response to increasing surface-to-surface friction between an interior contact surface of each one of the plurality of sheet layers and the interior contact surface of the directly adjacent one of the plurality of sheet layers; and locking positions of the plurality of sheet layers relative to each other in response to increasing the surface-to-surface friction; and maintaining the exterior engagement surface of the pliable structure in the final engagement-surface contour after disengaging the exterior engagement surface from the tool surface via the surface-to-surface friction due to the vacuum.

20. The method of claim 19, the vacuum is drawn within an internal volume of the pliable structure to increase the surface-to-surface friction between the interior contact surface of and to lock the positions of each one of a first impermeable layer, a second impermeable layer, a flow media layer, and a core layer of the pliable structure and an adjacent one of the first impermeable layer, the second impermeable layer, the flow media layer, and the core layer.

* * * * *